(12) United States Patent
Tinsley et al.

(10) Patent No.: US 11,925,154 B1
(45) Date of Patent: Mar. 12, 2024

(54) SYSTEM FOR PLANT CULTIVATION (71) Applicant: CGIP, Inc., Coral Springs, FL (US)

(72) Inventors: Michael Robert Tinsley, Coral Springs, FL (US); Frederick Ellingsworth Morgan, Coral Springs, FL (US); Douglas Allen Drew, Leesburg, FL (US)

(73) Assignee: CGIP, Inc., Coral Springs, FL (US)

( * ) Notice: Subject to any disclaimer, the term of this patent is extended or adjusted under 35 U.S.C. 154(b) by 0 days.

(21) Appl. No.: 18/100,168

(22) Filed: Jan. 23, 2023

Related U.S. Application Data (63) Continuation of application No. 29/856,144, filed on Oct. 11, 2022, and a continuation of application No. 29/856,141, filed on Oct. 11, 2022, and a continuation of application No. 29/856,146, filed on Oct. 11, 2022, and a continuation of application No. 29/856,148, filed on Oct. 11, 2022.

(51) Int. Cl.
*A01G 9/02* (2018.01)
*A47B 87/02* (2006.01)

(52) U.S. Cl.
CPC .......... *A01G 9/023* (2013.01); *A47B 87/0223* (2013.01)

(58) Field of Classification Search
CPC .............................. A01G 9/023; A47B 7/0223
See application file for complete search history.

(56) References Cited

U.S. PATENT DOCUMENTS

| | | | | |
|---|---|---|---|---|
| 3,314,192 A | * | 4/1967 | Park | A01G 9/022 47/18 |
| RE28,293 E | * | 1/1975 | Bustos | A47B 87/0269 108/151 |
| 4,255,896 A | * | 3/1981 | Carl | A01G 31/06 47/79 |
| 4,467,927 A | * | 8/1984 | Nathan | A47B 87/0223 211/186 |
| 4,706,576 A | * | 11/1987 | James | A47B 57/545 108/106 |
| 4,815,394 A | * | 3/1989 | Ettlinger | A47B 57/265 108/107 |
| 4,953,719 A | * | 9/1990 | Spamer | A47B 87/0223 211/188 |
| 5,123,552 A | * | 6/1992 | Aggelen | B62B 3/00 211/126.5 |
| D330,819 S | * | 11/1992 | Dickinson | D6/675.1 |
| 5,673,511 A | * | 10/1997 | Holtkamp, Jr. | A47F 7/0078 47/87 |
| 5,709,158 A | * | 1/1998 | Wareheim | A47B 87/0246 211/188 |
| D406,713 S | * | 3/1999 | Houk, Jr. | D6/705 |

(Continued)

FOREIGN PATENT DOCUMENTS

| CN | 202819107 U | 3/2013 |
|---|---|---|
| CN | 104756780 A | 7/2015 |

(Continued)

*Primary Examiner* — Monica E Millner
(74) *Attorney, Agent, or Firm* — Christopher & Weisberg, P.A.

(57) ABSTRACT

A system for plant cultivation includes decks having an upper face and a lower face, the decks disposed in a vertical array, each deck having sides connected at corners, each corner extending outward beyond the sides to form a protuberance.

4 Claims, 9 Drawing Sheets

(56) References Cited

U.S. PATENT DOCUMENTS

| | | | | |
|---|---|---|---|---|
| 6,243,985 B1* | 6/2001 | Miller | ............. | A01G 27/00 |
| | | | | 47/62 R |
| 6,312,139 B1 | 11/2001 | Baker et al. | | |
| 6,908,000 B2* | 6/2005 | Craft | ............. | A47B 81/002 |
| | | | | 211/144 |
| 7,475,512 B2 | 1/2009 | Van Den Dool | | |
| 7,568,436 B2* | 8/2009 | McAllister | ............. | A47B 57/265 |
| | | | | 211/187 |
| 7,886,673 B2* | 2/2011 | Korte | ............. | B62B 3/16 |
| | | | | 108/193 |
| 8,579,465 B2 | 11/2013 | Yamada et al. | | |
| 9,456,689 B1 | 10/2016 | Tinsley | | |
| 10,039,681 B2* | 8/2018 | Ballantyne | ............. | E04H 1/1277 |
| 10,098,293 B2 | 10/2018 | Tinsley | | |
| 10,638,678 B2* | 5/2020 | Collier | ............. | A01G 9/023 |
| 10,767,839 B2 | 9/2020 | Yang et al. | | |
| 10,791,686 B2* | 10/2020 | Zhan | ............. | A01G 9/249 |
| 11,178,824 B2 | 11/2021 | Heidl et al. | | |
| 11,277,977 B2* | 3/2022 | Wardlaw | ............. | A01G 9/12 |
| 11,304,525 B2* | 4/2022 | Siples | ............. | A01G 9/143 |
| 11,350,743 B2* | 6/2022 | Reinhart | ............. | A47B 87/0215 |
| 11,666,159 B2* | 6/2023 | Arriagada Lama | .. | A47B 87/008 |
| | | | | 29/428 |
| 2004/0129844 A1* | 7/2004 | Doyle | ............. | F16M 11/28 |
| | | | | 248/188.8 |
| 2004/0182810 A1* | 9/2004 | Rosen | ............. | A47F 5/13 |
| | | | | 211/188 |
| 2009/0260282 A1* | 10/2009 | Hashimoto | ............. | A01G 31/02 |
| | | | | 47/20.1 |
| 2010/0107489 A1* | 5/2010 | Silver | ............. | A01G 9/249 |
| | | | | 47/58.1 R |
| 2011/0252705 A1* | 10/2011 | Van Gemert | ............. | A01G 9/249 |
| | | | | 47/66.7 |
| 2012/0011768 A1* | 1/2012 | Martinez | ............. | A01G 9/143 |
| | | | | 47/39 |
| 2012/0060416 A1* | 3/2012 | Brusatore | ............. | A01G 31/06 |
| | | | | 47/62 A |
| 2012/0286221 A1* | 11/2012 | Doyle | ............. | B66F 3/42 |
| | | | | 254/98 |
| 2015/0047258 A1* | 2/2015 | Lewis | ............. | A01G 9/023 |
| | | | | 47/79 |
| 2015/0136000 A1* | 5/2015 | Holtschi | ............. | A47B 9/20 |
| | | | | 108/146 |
| 2015/0351325 A1 | 12/2015 | Shelor et al. | | |
| 2017/0013794 A1 | 1/2017 | Tinsley | | |
| 2017/0027110 A1* | 2/2017 | Ito | ............. | A01G 7/045 |
| 2019/0082620 A1* | 3/2019 | Griffin | ............. | A01G 9/247 |
| 2022/0104443 A1* | 4/2022 | Chang | ............. | A47B 47/045 |

FOREIGN PATENT DOCUMENTS

| | | |
|---|---|---|
| CN | 107711475 A | 2/2018 |
| CN | 108255213 A | 7/2018 |
| CN | 108388295 A | 8/2018 |
| CN | 207820616 U | 9/2018 |
| CN | 112602504 A | 4/2021 |
| CN | 212932953 U | 4/2021 |
| CN | 113317057 A | 8/2021 |
| CN | 214335558 U | 10/2021 |
| KR | 1020150113457 A | 10/2015 |

* cited by examiner

FIG. 9

SYSTEM FOR PLANT CULTIVATION

CROSS-REFERENCE TO RELATED APPLICATION

This application claims priority to U.S. Design patent application No. 29856141, filed Oct. 11, 2022, U.S. Design patent application No. 29856144, filed Oct. 11, 2022, U.S. Design patent application No. 29856146, filed Oct. 11, 2022 and U.S. Design patent application No. 29856148, filed Oct. 11, 2022.

FIELD

The present technology is generally related to agriculture and horticulture and more particularly to a system for plant cultivation.

BACKGROUND

Commercial agriculture is commonly conducted outdoors in fields. It is also conducted indoors or in greenhouses to optimize growing conditions, especially during cold seasons to effectively create a year-round, optimal, growing environment. Indoor agriculture also helps mitigate or eliminate crop loss due to vermin and insects, as well as human vandalism and theft.

However, few, if any, indoor agricultural spaces are as large as outdoor fields that can be dozens, hundreds or thousands of acres in growing area. Because indoor spaces are generally significantly smaller, space must be very well used in the hope of increasing yield. In addition to minimizing horizontal spacing between plants, vertical space can be used by providing shelves onto which plants may be disposed. Thus, for example, a 5,000 square foot room (field) with 5 layers of shelves is transformed into a 25,000 square foot room (field). The more shelves that are used, the greater the available growing area. However, depending upon configuration and loading, taller shelving units (greater than 10') can be unstable and therefore dangerous to work around in addition to being difficult to service.

There are many challenges growing plants indoors close together and on a vertical array of shelves or platforms, to include adequate or optimal lighting, ventilation, irrigation, physical manipulation, and more. Generally, commercial and/or large-scale indoor operations provide built-in, fixed shelving and support accessories such as room lights and sprinklers mounted to the ceiling. Smaller operations down to home growing may use garage storage shelves or plant stands. However, known indoor facilities and equipment used for indoor plant cultivation lack features that maximize plant and crop yield.

Indoor, "artificial sunlight" can be a significant contributor to expense due to electric cost. When electricity is expensive, even if energy efficient lighting is used, the economics of the operation only work for higher cost/value plants. Further, the light provided by ceiling lighting is particularly challenging because the light available to plants on shelves that are on the top level are exposed to very different lighting than the plants below them and on lower levels. Thus, if the lights must have a very high output to ensure occluded plants are sufficiently lit, it not only increases electric bills, but the plants on the upper level(s) receive too much light.

Simply blasting the plants with light, however, in addition to being expensive and wasteful, does not optimize plant growth. Rather it has been determined that plants thrive when particular levels of light are provided at particular frequencies and a value known as photosynthetically active radiation (PAR) takes this into account. Essentially a PAR value is the amount of light that is actually available to be used during the photosynthesis process. There may be more light emitted from a particular source, but plants don't make use of all of it—some of it has no real effect on the photosynthesis process. The term lumen is a measure of brightness or how much light is actually emitted from any particular light source at a given time. While traditional light bulbs may be high in lumens, they won't necessarily be very high on the PAR scale. Plants experience the best growth when exposed to both blue and red lights and this type of light, while still visible to the human eye, is better measured in terms of PAR than lumens. As part of the visible color spectrum blue and red light are found between 400 nm and 700 nm and as you approach 700 nm the PAR exposure increases. As a plant grows from a seed to a mature plant its need for light shifts from the blue to the red end of the spectrum, and exposure between that 400 nm and 700 nm range at the appropriate level for each stage of the plant's growth cycle results in healthy and productive plants.

SUMMARY

The present invention provides a system for plant cultivation that is suitable for both large and small-scale operations. Significantly, the system is modular and movable and is therefore particularly well suited for any size operation whether temporary or permanent. The system is easily configurable for irregular size spaces and includes many features that promote optimal growth and crop yield.

In an exemplary configuration, the system has decks with an upper face and a lower face, the decks disposed in a vertical array, each deck having sides connected at corners, each corner extending outward beyond the sides to form a protuberance. Each protuberance defines a passage from a lower deck face to an upper deck face. Accessories disposed through a passage of at least two decks, may include electrical cables, lighting elements, ventilation conduits, and fluid management tubing.

When multiple sets or units of decks are provided, additional advantages become apparent. For example, when a first unit is placed next to a second unit, the corners on one side of each of the of units are in abutment and define an aperture between adjacent deck sides. The size of the aperture is related to the size of the protuberances, wherein the aperture permits proper plant spacing ventilation and light access, as well as maintenance access. The decks can include a cross-brace that provides structural strength to the deck and defines a passage from the lower face to the upper face of the deck.

The aperture and the passage(s) allow accessories to be disposed through the passage of at least two decks. The accessories can include electrical cables, lighting elements, ventilation conduits, and fluid management tubing.

To facilitate movement as well as stability, the system further includes a lifting and locking element having a first state wherein the decks are vertically displaced from the ground and a second state wherein the decks are in contact with the ground. Wheels can be disposed on a bottom portion of a bottom deck, wherein in the first state the plurality of wheels is vertically displaced from the ground and in the second state the plurality of wheels is in contact with the ground.

Telescopic legs can be provided to join decks and a motor in communication with the telescopic legs can cause them to extend and retract. An event sensor, such as LIDAR, and a controller can be provided so that the controller is responsive to the event sensor to control extension of the legs.

The details of one or more aspects of the disclosure are set forth in the accompanying drawings and the description below. Other features, objects, and advantages of the techniques described in this disclosure will be apparent from the description and drawings, and from the claims.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION

Figure 1:
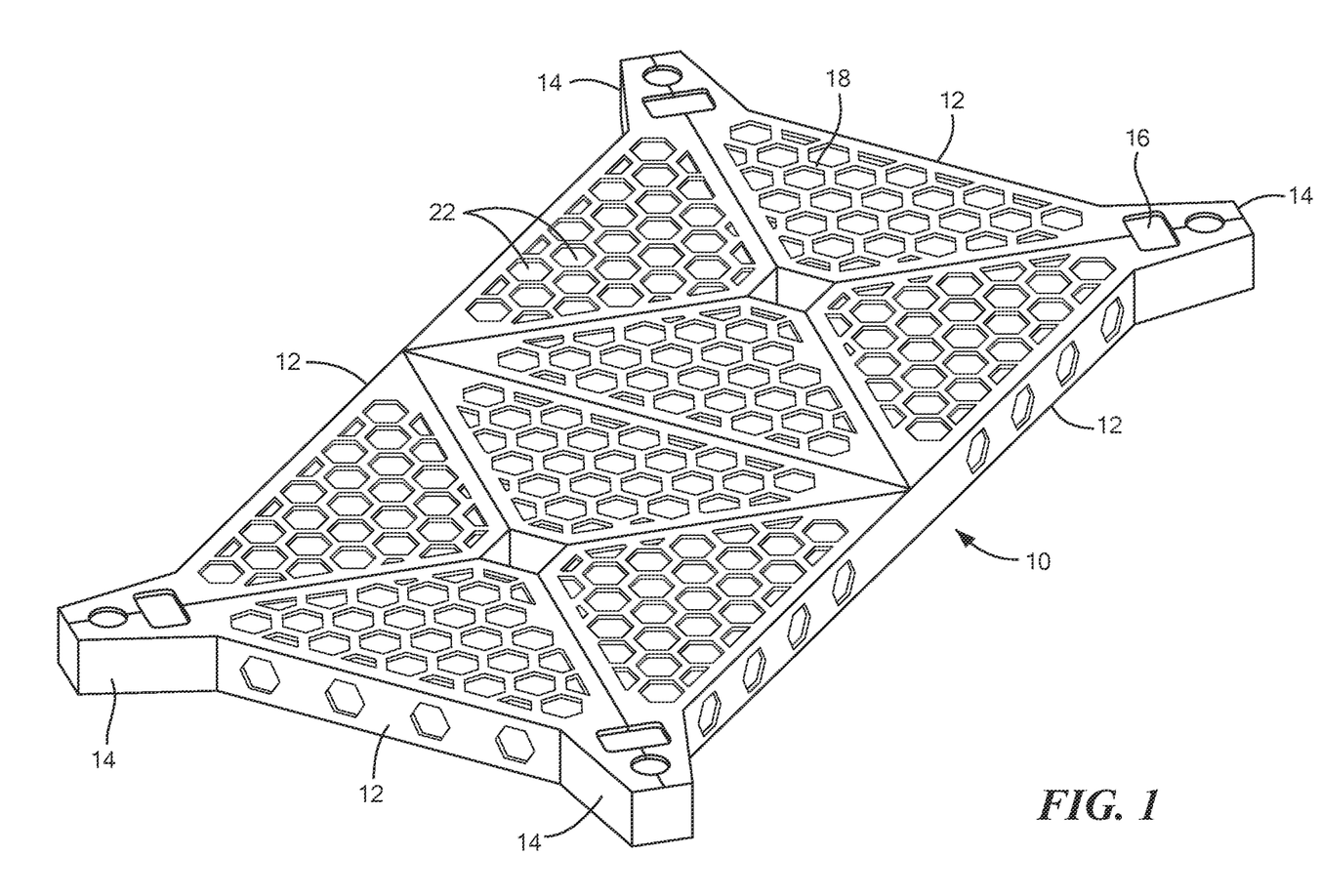
FIG. 1 is a perspective view of a deck that is part of a system in accordance with the invention.

Turning now to FIG. 1, a perspective view of a deck 10 is shown. As will be described below, the deck 10 is part of a system in accordance with the invention. The deck 10 is shown as being generally rectangular, with four opposing sides 12. Adjacent sides 12 meet at corners, each corner extending outward beyond the sides to form a protuberance 14. Each protuberance 14 defines a passage 16 from an upper deck face 18 to a lower deck face 20 (shown in FIG. 3). Objects such as accessories (not shown) can be disposed through the passage 16. Exemplary accessories include electrical cables, lighting elements, ventilation conduits, and fluid management tubing. The use of these accessories will be described below as part of the system.

Figure 2:
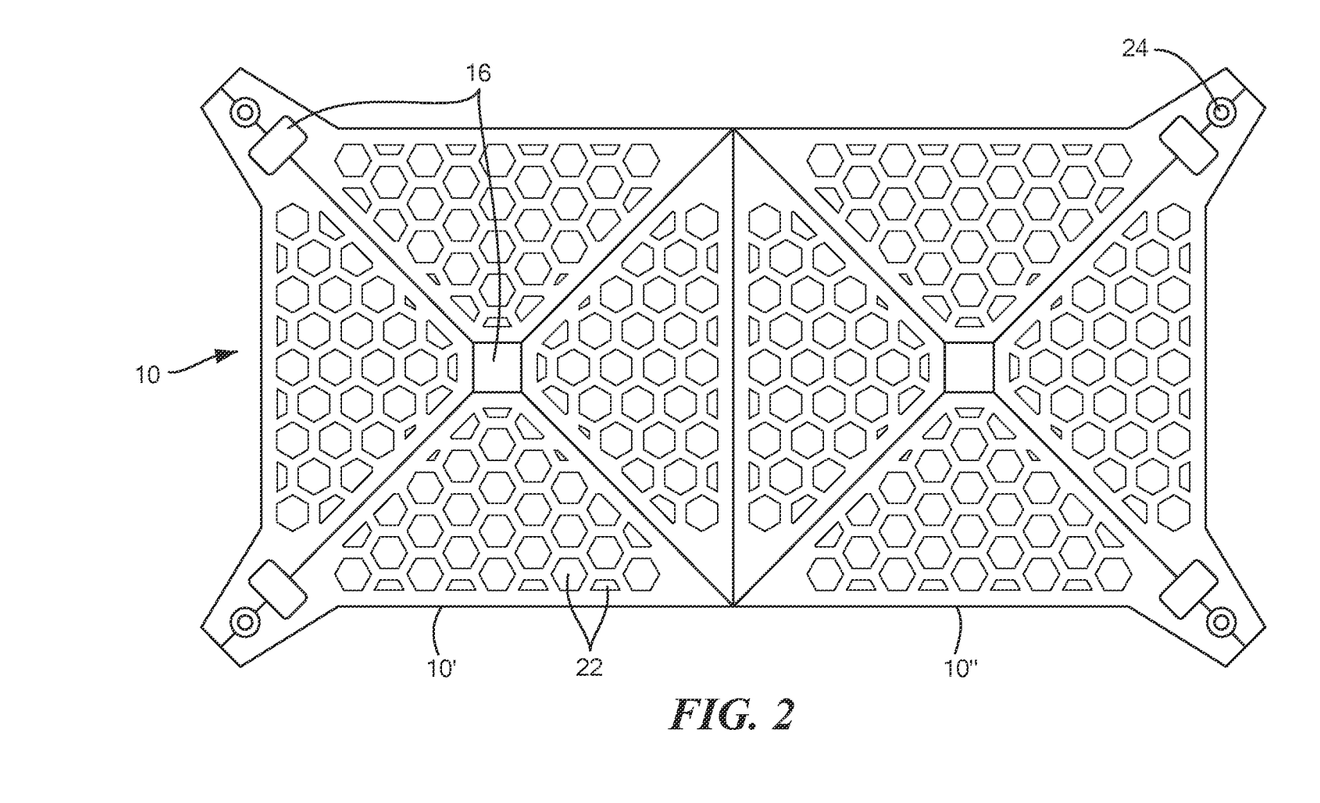
FIG. 2 is a plan view of an upper face of the deck of FIG. 1.

FIG. 2 is a plan view of the upper face 18 of the deck 10 of FIG. 1. In this view passages 16 in the protuberances 14 are shown as well as one or more passages 16 at a selected location on the deck 10 within the perimeter of the sides 12. As show, the deck has two portions 10' and 10" and each defines a passage 16 in the center of the portion. As with the other passages, these passages permit the placement of accessories from the lower face to the upper face of the deck.

FIGS. 1 and 2 also show supplemental passages 22 in the deck. These passages can reduce the weight of the deck and allow for light, air and water to pass from the upper face 18 of the deck 10 to the lower face 20 of the deck. Additionally, mounting or connection sockets 24 are provided in each protuberance 14 for support or connecting structures such as legs (described below). By placing the legs and passages at the protuberances, the deck is unobstructed and fully usable to support objects such as plant containers.

Figure 3:
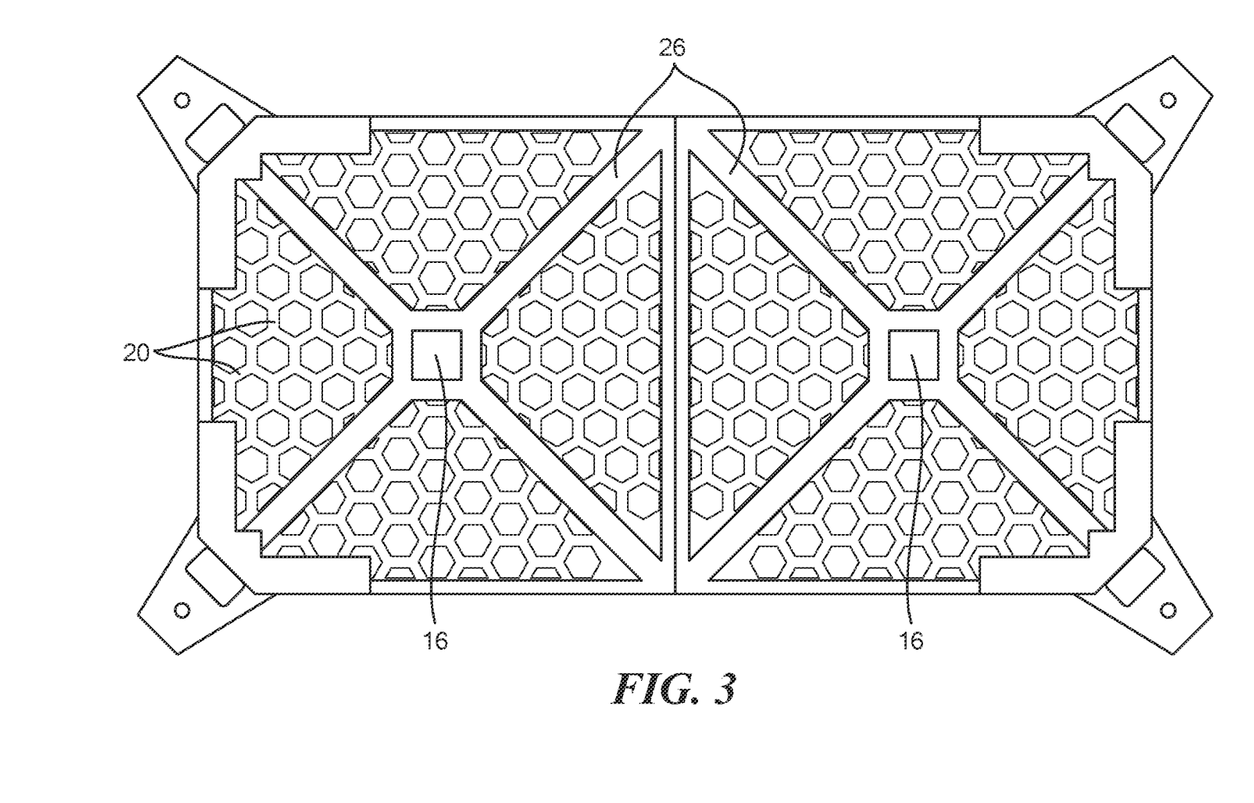
FIG. 3 is a plan view of a lower face of the deck of FIG. 1.

FIG. 3 is a plan view of a lower face of the deck of FIG. 1. In this view cross-braces 26 are shown to provide structural strength to the deck 10. Optionally, the cross-braces 26 can define a passage from the lower face to the upper face of the deck. As shown, the cross-braces define the passage at the center of each half of the deck.

Figure 4:
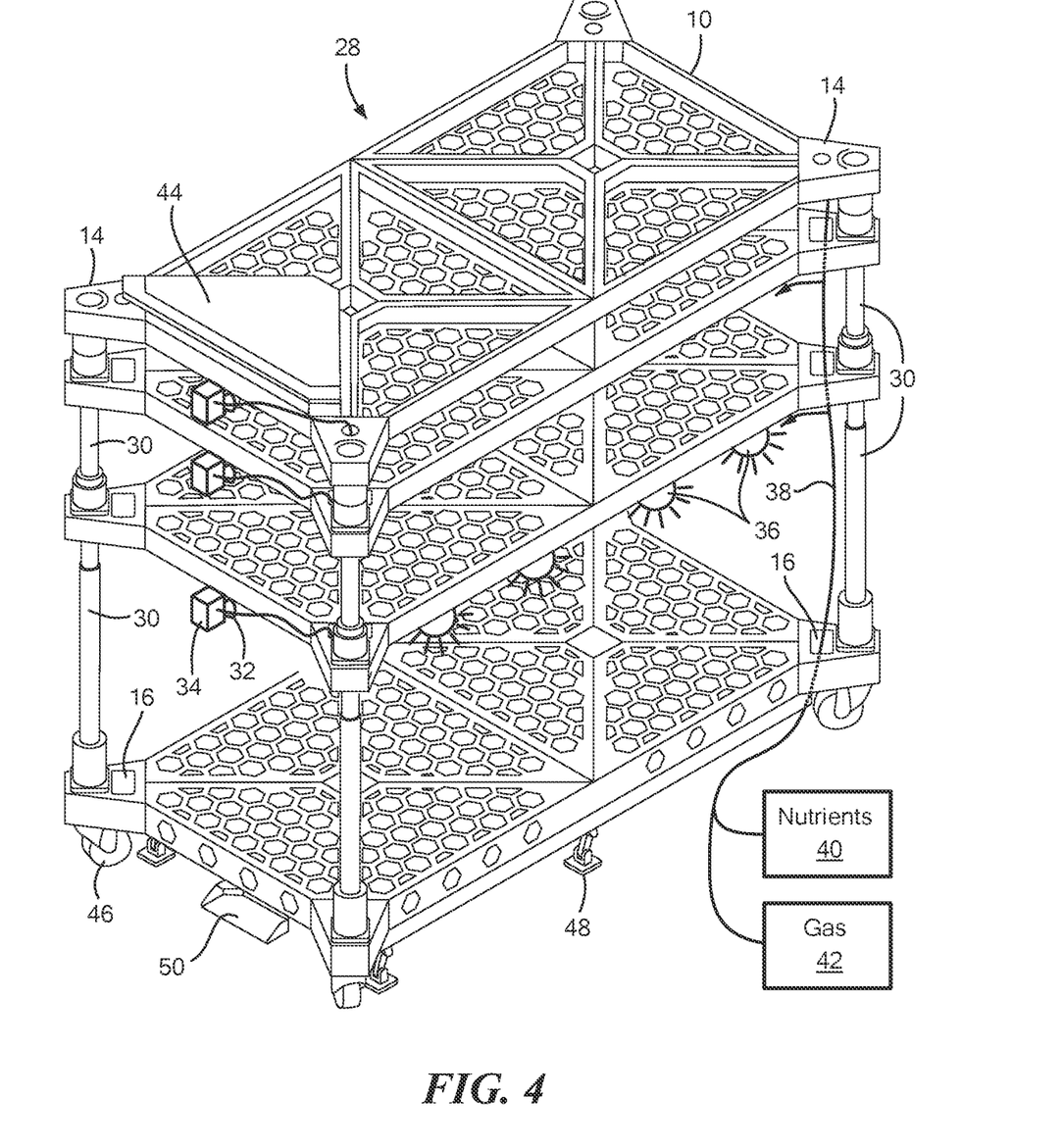
FIG. 4 is a perspective view of the system in accordance with the invention.

Turning now to FIG. 4, a perspective view of a system 28 in accordance with the invention is shown. In the illustrated system, four decks 10 are provided. Each of the decks are joined by legs 30 secured at the protuberances 14. The legs 30 can have a fixed length, wherein the length of the legs at each level can be the same or different to establish desired spacing between the decks 10. One or more sets (levels) of legs 30 can be telescopic so that the length of the legs can be adjusted as desired to establish desired spacing between decks. The telescopic legs 30 can be provided with electric, screw-jack, pneumatic or hydraulic motors internal or external to the legs (not shown) to extend and retract the legs. In this way, the distance between decks can be established based upon the type of container and/or plant as well as the growth stage of the plant, or a selected PAR value. An event sensor 32, such as an optical sensor or LIDAR, and a controller 34 in communication with the motors for the legs 30, can be provided so that the controller is responsive to the event sensor to control extension/retraction of the legs. In an exemplary embodiment a LIDAR unit is associated with each deck to measure the distance between shelves while a separate optical sensor is directed towards the plants.

Figure 8:
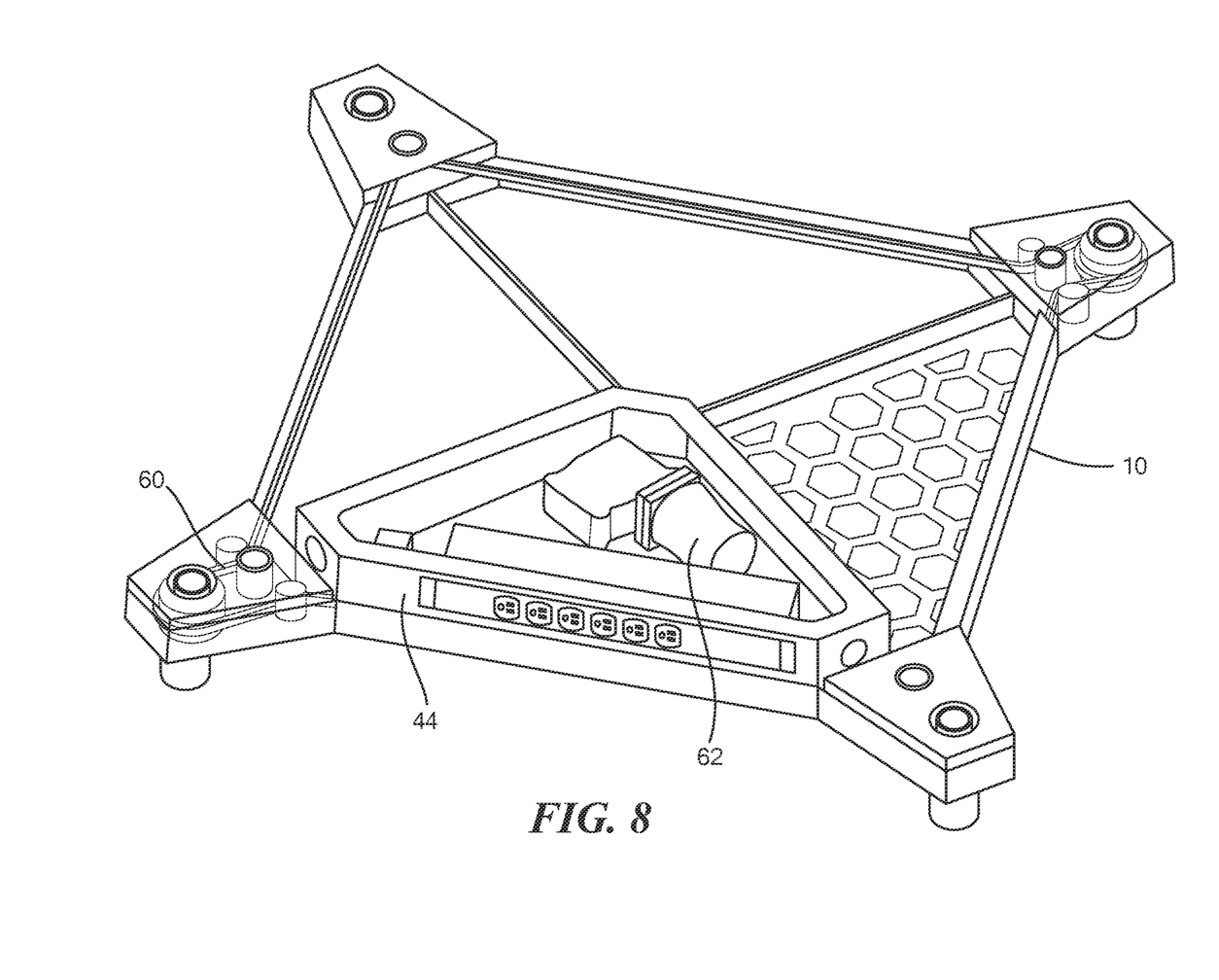
FIG. 8 illustrates a control hub and mechanism for extending and retracting telescopic legs.

Referring to FIG. 8, a view of a deck 10 is shown to better visualize a drive system for telescopic legs 40. As shown, a serpentine belt 60 is driven by a motor 62, housed in a control hub 44, to move the belt clockwise or counterclockwise. The serpentine belt engages with the legs 40 to rotate them (a screw jack) and thereby provide smooth movement of all the legs at the same time.

Referring again to FIG. 4, lights 36 are associated with each deck 10. It is notable that the lights face each deck directly and are not obscured by decks and or plants above. Because the lights are inherently closer to the decks and the plants thereon than ceiling mounted lights, the energy requirement is lower and the plants are exposed to more consistent lighting at a selected PAR value. The lights can be provided as discrete elements/bulbs or as part of a light bar having multiple elements/bulbs, such as an energy efficient LED light bar. The lights can be disposed on the undersurface or along the edges of one or more decks, as well as vertically through the passages at the corners or center of the decks to achieve a desired PAR level. Blackout curtains with reflective interior surfaces can surround entire systems or groups of systems. Similarly, insect screening can surround the system(s).

The lights can be independently and manually operated, or they can be in communication with the controller 34. The controller 34 can be provided with an algorithm that adjusts light intensity/output by the lights 36 as function of time of day, day of the year, type of plant, growth rate, size of plant, selected PAR value, or input from the event sensor 32. Each light and/or each set of lights associated with a specific deck can be independently controlled. Thus, if uniform growth and/or growth rate is desired, and the event sensor detects differences in plant height or development, selected lights can be controlled to adjust light output to speed up or slow down individual plant growth or the growth of groups of plants.

As noted above, the aperture/passages 16 allow accessories 38 to be disposed through the passages of at least two decks 10. The accessories can include electrical cables, lighting elements, ventilation conduits, and fluid management tubing. As shown in FIG. 4, an exemplary water/nutrient supply 40 is provided, as well as an exemplary air or gas supply 42. Selected accessories 38 such as fluid or gas lines are provided to convey liquids and/or gases to the decks for application as desired from above, sides or floor level. The liquids can include water and water-born nutrients and the gases could be heated or cooled room air or provided with supplemental gasses such as $CO_2$ that favor plant growth and disease management. As with the lighting, the liquid and gas supply and distribution can be in communication with the controller and the volume and content of liquid and gas can be adjusted per an algorithm that adjusts volume and content as function of time of day, day of the year, type of plant, growth rate, size of plant, or input from the event sensor 32. Thus, if uniform growth and/or growth rate is desired, and the event sensor detects differences in plant height or development, selected liquids and gases can be controlled to speed up or slow down individual plant growth or the growth of groups of plants.

Also shown in FIG. 4 is an electrical accessory box or control hub 44 that can be in connection with accessories 38 that include electrical wires and/or network communication cables in connection with an electrical or communication source (not shown). The electrical wires provide power to the lights 36, the controller 34, event sensor 32, and motors for telescopic legs 30. Placing the control hub at the top of the system is advantageous because power and other lines and accessories provided from above the system are safer that line running on the floor can be trip hazards and more easily cut or damaged. Further, lines from above don't interfere with movement and repositioning of the system.

Continuing to refer to FIG. 4, wheels 46 are shown secured to and extending from each of the protuberances 14 of the lowest deck 10. The wheels 46 allow the system 28 to be easily moved. A number of feet 48 are also secured to and extend from the lowest deck 10. The feet 48 are transitionable from a first or raised condition to a second or lowered condition. When the feet are raised, the system 28 can easily be rolled and repositioned as desired. When the feet 48 are lowered, the wheels 46 are lifted from the ground and the system is immovable. A foot actuator 50 is connected to movable linkages 52 (see FIG. 5) to cause the feet 48 to transition from raised and lowered conditions. Together, the foot actuator 50, the linkages 52 and the feet are considered a lift and lock device. In operation, the foot actuator 50 is activated, the feet 48 are raised and the system 28 is positioned where desired. When in position, the foot actuator 50 is activated and the feet are lowered to lift the wheels 46 from the ground and immobilize the system 28. Importantly, the system 28 is moved vertically and not tilted. If the system 28 were to tilt, then objects like potted plants on the decks might topple over or off of the decks. Also, by raising the lower deck 10 up from floor level, space is provided for ventilation and drainage.

Figure 5:
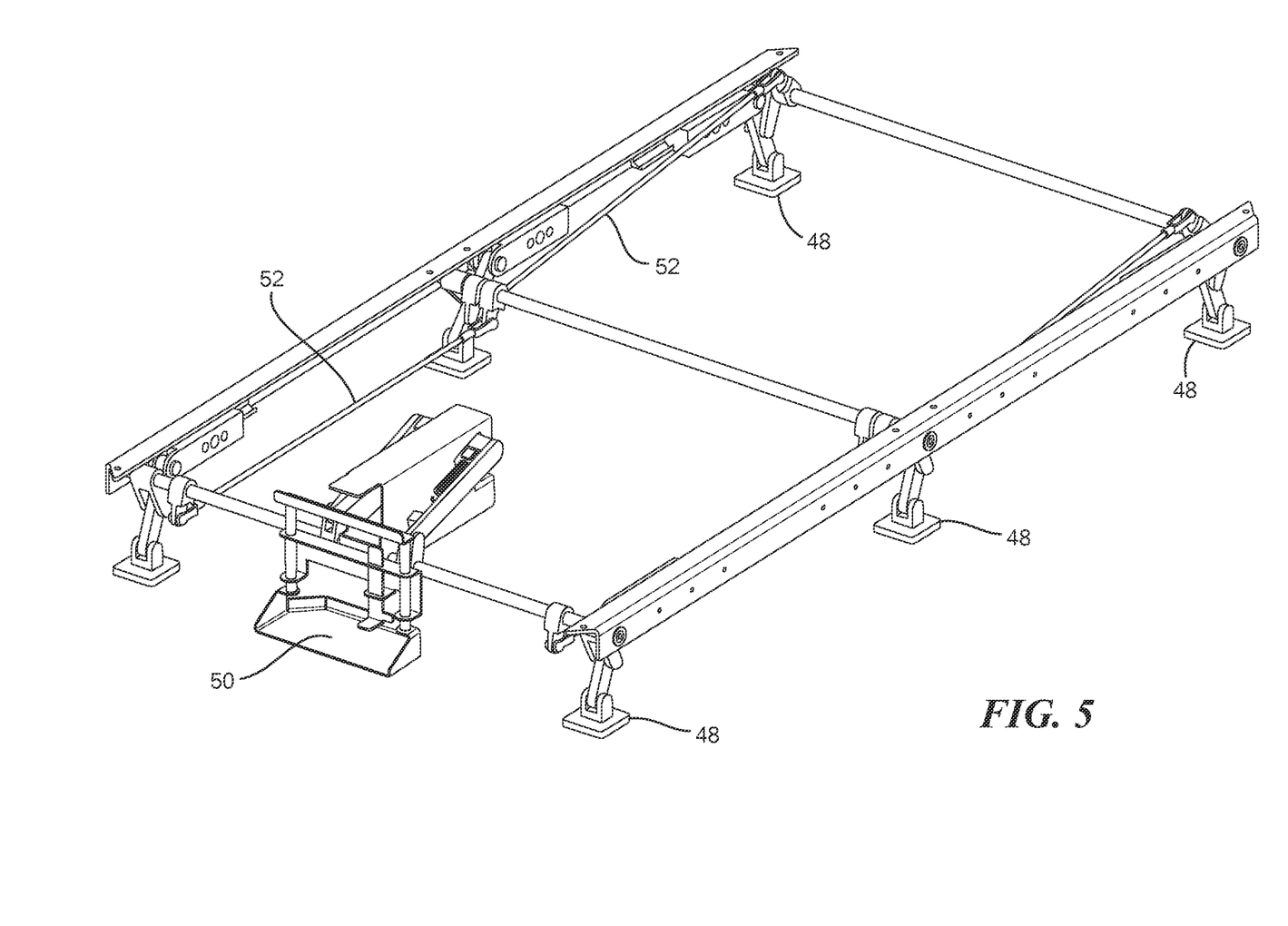
FIG. 5 is a perspective top view of the lift and lock device shown in FIG. 5.

FIG. 5 is a perspective top view of feet 48, foot actuator 50, and linkages 52 that comprise the lift and lock device. It should be noted that the stability provided by having multiple flat feet 48 supporting the decks is much greater than a system with wheels (even if they lock). Specifically, wheels inherently provide a small contact surface due to the circular nature of a wheel. For example, a wheel that is 5" in diameter, having a 1" width provides only about 1.5 square inches of contact surface with the floor. Thus, four wheels provide about 6 square inches of contact surface which can cause instability or sway when the system is fully loaded, at full extension, or while decks are being raised and lowered.

Figure 9:
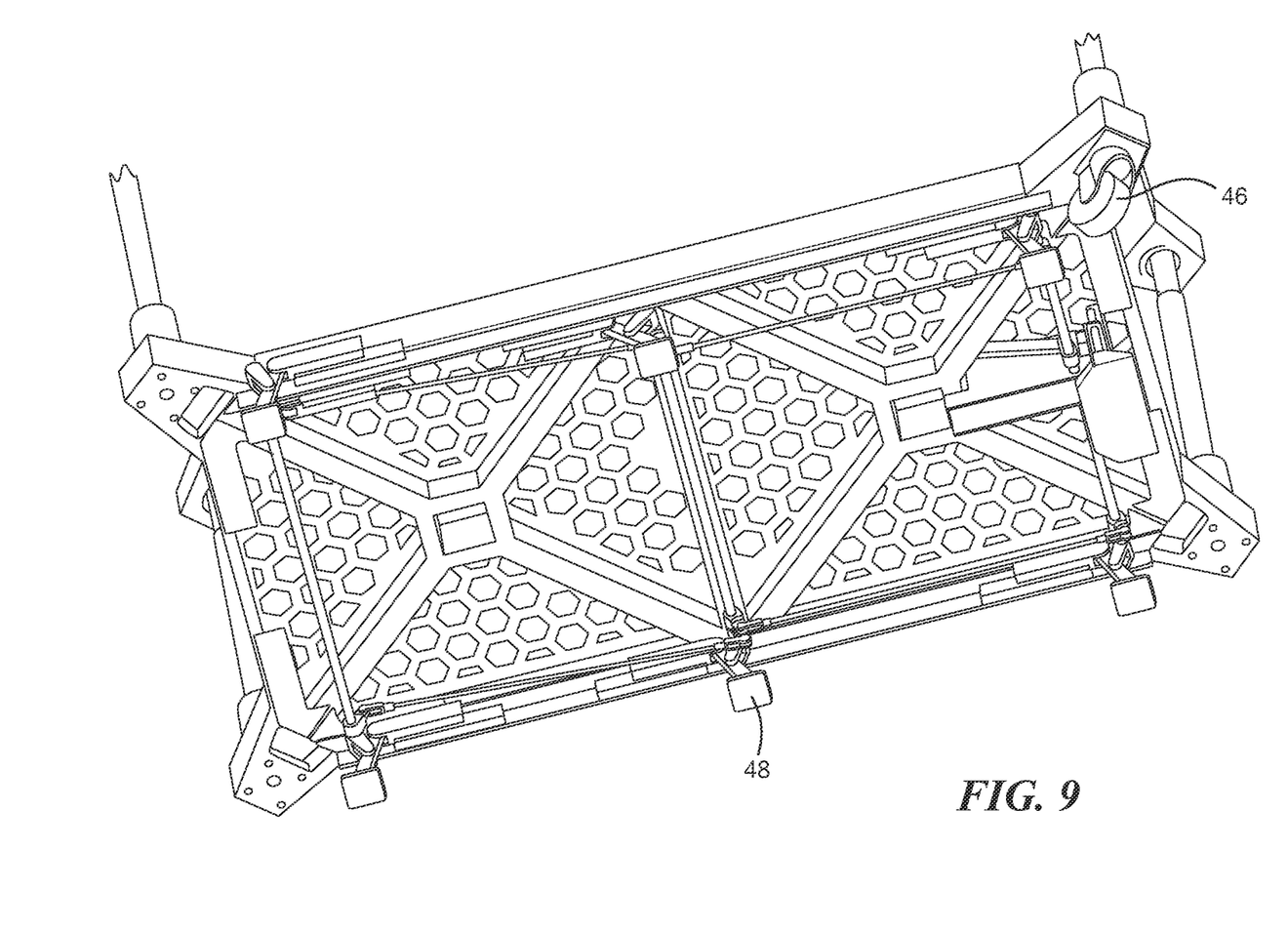
FIG. 9 is a bottom perspective view of the system.

FIG. 9 is a bottom perspective view of the lower deck of a system. In this view, one exemplary wheel 46 is illustrated along with six feet 48.

In an exemplary system each deck is either 3'×3' or 3'×6' and 10' tall at full extension. Taller shelving can be dangerous, especially at high loaded weights. An exemplary system, the system can weigh about 250 pounds and can support 700-1,000 pounds. At this weight, it is highly undesirable to have a fully loaded system (hydroponic system, water, lights, tubing, and plants) to be swaying if knocked, bumped. By contrast, the feet 48 of the present invention each provide about 18 square inches of contact surface (108 square inches compared to about 6 square inches with wheels. The benefit is that the system can be mechanically lifted, while remaining stable with no tilting. This also provides superior stability as the decks are raised and lowered.

Figure 6:
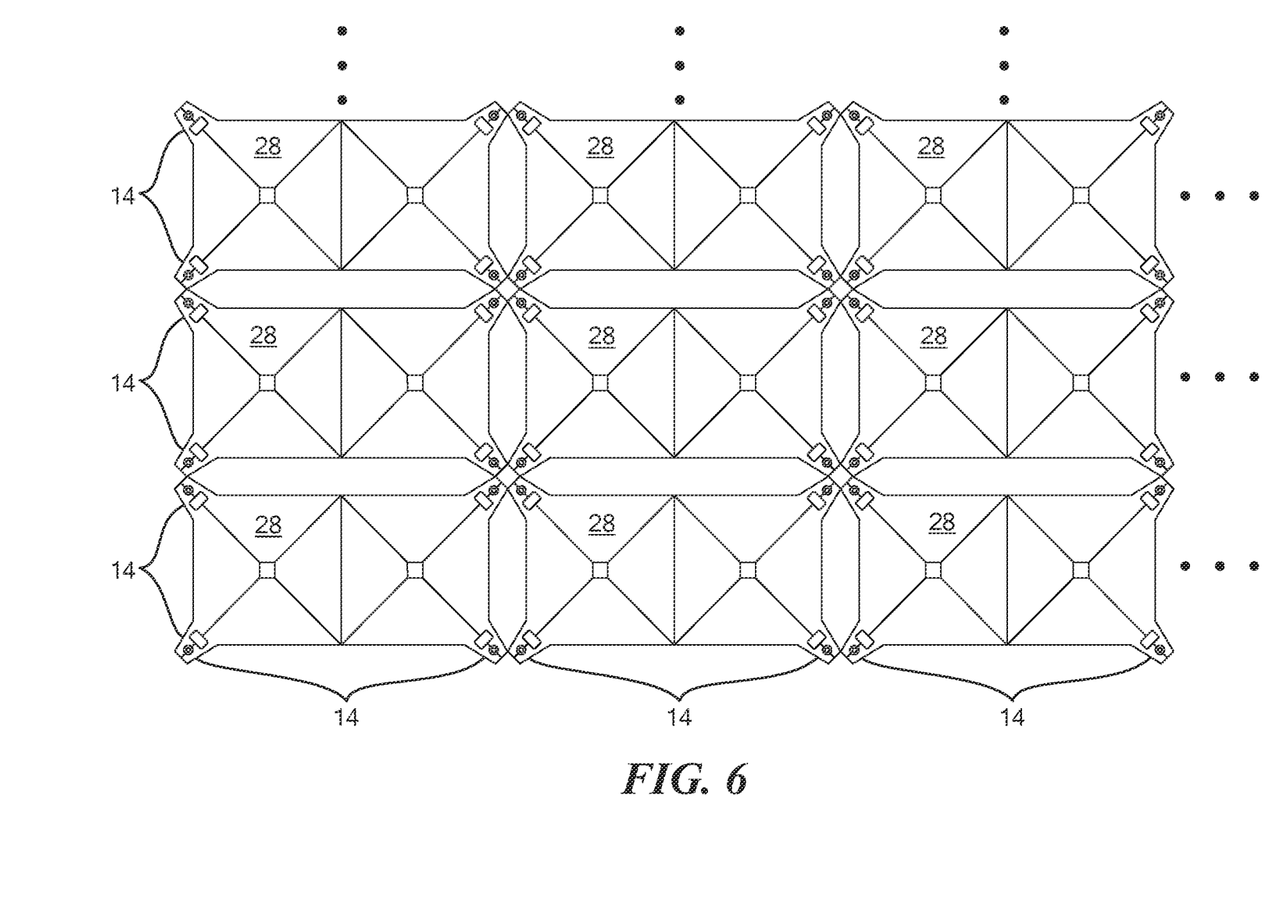
FIG. 6 is a top view showing multiple systems disposed in an array.

Referring now to FIG. 6, a top view of an exemplary array of systems 28 is shown. In this configuration, several units (systems) 28 are aligned and placed in contact so that the protuberances 14 of adjacent systems contact each other to ensure that a spacing between adjacent decks, defined by the extension of the protuberances, is maintained to prevent crowding and permit air circulation. By placing systems 28 adjacent in this manner, available floor space utilization is maximized, and stability of the systems is further enhanced beyond the enhanced stability provided by the lift and lock system of feet.

Figure 7:
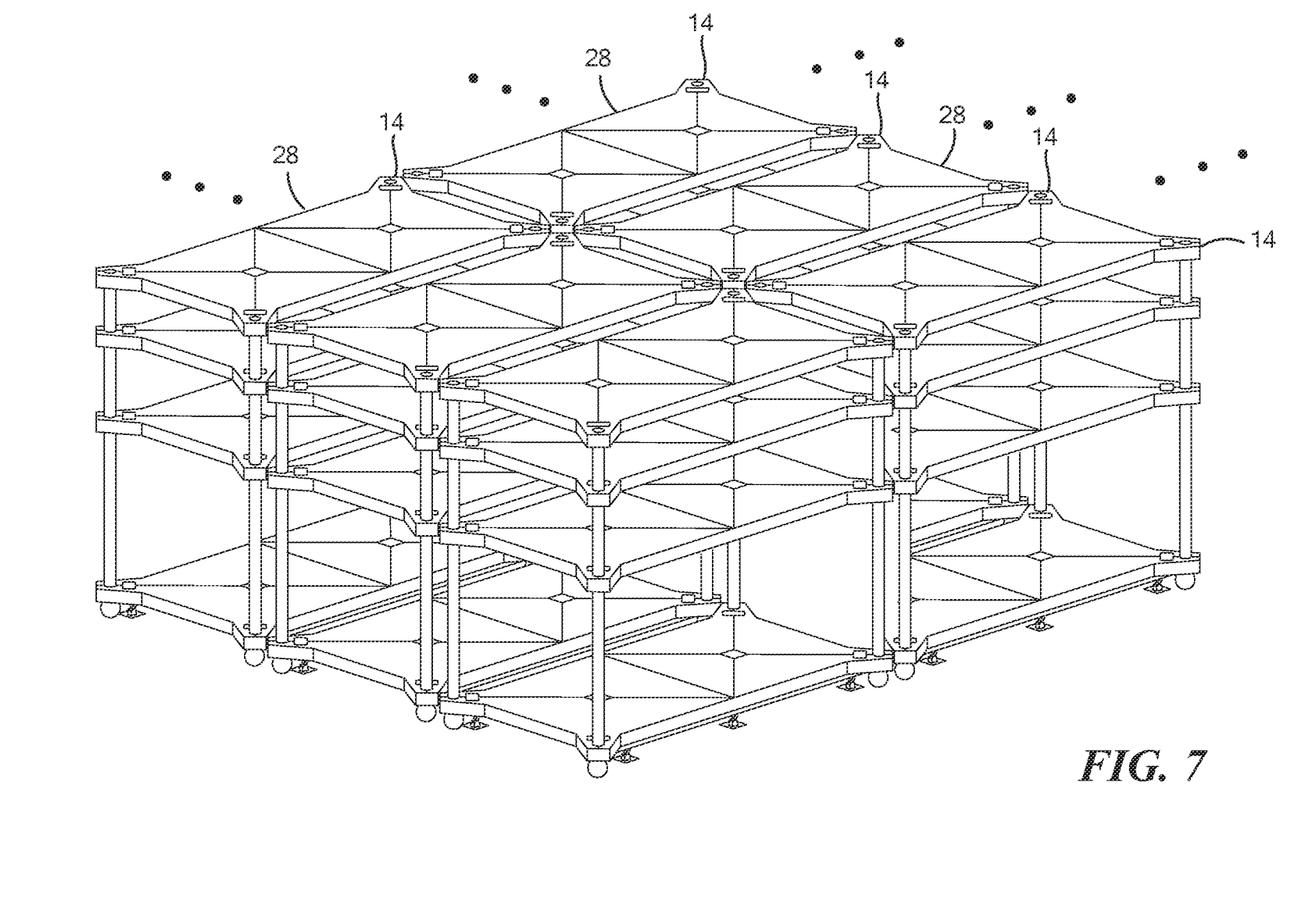
FIG. 7 is a perspective view of an array of systems showing displacement of systems with respect to the array.

FIG. 7 is a perspective view of an array of systems 28. If the desire is to occupy as much available floor space as possible with a large array, such as a 20 by 30 array of systems, it might not be possible to access systems inward of the periphery but for the lift and lock system which allows systems to be moved as needed, with safety and stability, to allow access to any system in the array.

It should be understood that various aspects disclosed herein may be combined in different combinations than the combinations specifically presented in the description and accompanying drawings. It should also be understood that, depending on the example, certain acts or events of any of the processes or methods described herein may be performed in a different sequence, may be added, merged, or left out altogether (e.g., all described acts or events may not be necessary to carry out the techniques). In addition, while certain aspects of this disclosure are described as being performed by a single module or unit for purposes of clarity, it should be understood that the techniques of this disclosure may be performed by a combination of units or modules.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor" or "controller" as used herein may refer to any of the foregoing structure or any other physical structure suitable for implementation of the described techniques. Also, the techniques could be fully implemented in one or more circuits or logic elements.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. A system for plant cultivation comprising:
a first plurality of decks, each deck having an upper face and a lower face, the plurality of decks disposed in a vertical array, each deck having a plurality of sides connected at corners, each corner extending outward beyond the sides to form a protuberance;
a lifting and locking element having a first state wherein the plurality of decks is vertically displaced from the ground and a second state wherein the plurality of decks is in contact with the ground;
a plurality of wheels disposed on a bottom portion of a bottom deck, wherein in the first state the plurality of wheels is vertically displaced from the ground and in the second state the plurality of wheels is in contact with the ground; and
a plurality of feet that are movably secured to the bottom portion of the bottom deck and an actuation mechanism secured to the feet to cause them to move vertically, wherein in a first position the plurality of feet extend farther from the bottom portion of the bottom deck than the wheels and in a second position the wheels extend farther from the bottom portion of the bottom deck than the feet.

2. The system of claim 1, wherein the actuation mechanism is a foot pedal in mechanical communication with the plurality of feet.

3. The system of claim 1, wherein the mechanical communication is a link that translates horizontally to cause the plurality of feet to swing in unison.

4. A system for plant cultivation comprising:
a first plurality of decks, each deck having an upper face and a lower face, the decks disposed in a vertical array, each deck having a plurality of sides connected at corners, each corner extending outward beyond the sides to form a protuberance, wherein each protuberance defines a first and second passage from the lower face to the upper face, and
accessories disposed through one of the first and the second passage of at least two decks of the first plurality of decks, wherein the accessories are selected from the group consisting of electrical cables, lighting elements, ventilation conduits, and fluid management tubing;
a cross-brace that provides structural strength to each deck of the plurality of decks and defines a third passage from the lower face to the upper face of each deck;
a lifting and locking element having a first state wherein the plurality of decks is vertically displaced from the ground and a second state wherein the plurality of decks is in contact with the ground;
a telescopic leg secured in the second passage of each protuberance;
a motor in communication with the telescopic leg to cause it to extend and retract; and
an event sensor and a controller that are in communication with the motor, wherein the controller is responsive to the event sensor to control extension of the legs telescopic leg.

* * * * *